United States Patent Office 3,318,922
Patented May 9, 1967

3,318,922
13 - SUBSTITUTED ALKYL-17-HYDROXYGONA-4-EN - 3 - ONES AND THEIR 17α SUBSTITUTION PRODUCTS
Thomas B. Windholz, Westfield, Arthur A. Patchett, Metuchen, and John Fried, Plainfield, N.J., assignors to Merck & Co., Inc., Rahway, N.J., a corporation of New Jersey
No Drawing. Filed Oct. 1, 1962, Ser. No. 227,581
12 Claims. (Cl. 260—397.4)

This invention relates generally to novel steroid compounds and processes for preparing the same. More particularly, it relates to novel 17-hydroxygona-4-en-3-ones, their 17α-substitution products, esters of the foregoing, and the preparation thereof from certain polycyclic condensation products. The steroids of this invention possess useful anabolic and/or progestational activity.

Said polycyclic condensation products, which are the starting materials for the steroids of this invention, are denoted as 3-alkoxy-8,14-secogona-1,3,5(10),9(11)-tetraene-14,17-diones and, preferably, are those having hydrogen or other substituents in the C-13 position, as illustrated by the following formula:

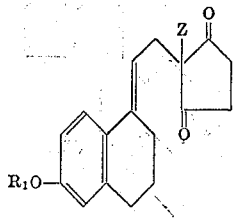

wherein $R_1$ is an alkyl radical and Z is a member selected from the group consisting of a hydrogen atom, an alkyl radical having at least 2 carbon atoms, and trifluoromethyl —$CH_2M$ and —$CHM_2$ radicals in which M is a member selected from the group consisting of halo, —$COOR_4$, —$OR_4$ and —CN radicals, said $R_4$ being a lower alkyl radical. These novel polycyclic condensation products comprise the subject matter of a copending application filed simultaneously herewith and may be chemically denoted as 3-alkoxy-13-Z-8,14-secogona-1,3,5(10),9(11)-tetraene-14,17-diones.

The starting material utilized in the preparation of the aforementioned polycyclic condensation products is 1-vinyl-6-alkoxy-1-tetralol, which may be represented by the following structural formula:

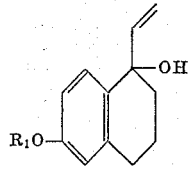

wherein $R_1$ is an alkyl radical, preferably having from 1 to 9 carbon atoms. These compounds may be prepared by the method reported in Dokladii Akad. Nauk SSSR 112, 1067 (1957) for 1-vinyl-6-methoxy-1-tetralol.

It has been found that 1-vinyl-6-alkoxy-1-tetralol will react with cyclopentane-1,3-diones to form the corresponding 3-alkoxy-13-Z-8,14-secogona - 1,3,5(10),9(11)-tetraene-14,17-dione starting materials of this invention. The preferred cyclopentane-1,3-diones that are operable herein may be generically denoted as 2-Z-cyclopentane-1,3-diones and may be chemically represented as follows:

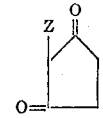

wherein Z is a member selected from the group consisting of a hydrogen atom, an alkyl radical having at least 2 carbon atoms, and —$CF_3$, —$CH_2M$ and —$CHM_2$ radicals, in which M is a member selected from the group consisting of halo, —$COOR_4$, —$OR_4$ and —CN radicals, said $R_4$ being a lower alkyl radical. The interaction of 1-vinyl-6-alkoxy-1-tetralol and the foregoing cyclopentane-1,3-diones may be chemically illustrated by the following equation:

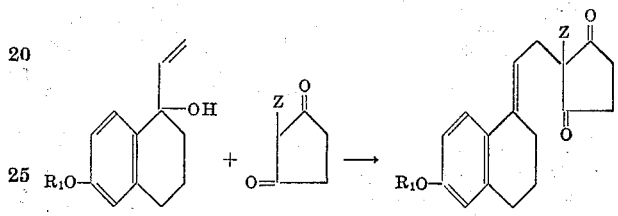

Said 3-alkoxy-13-Z-8,14-secogona-1,3,5(10),9(11)-tetraene-14,17-diones are preferably prepared by dissolving 1-vinyl-6-alkoxy-1-tetralol in an inert organic solvent containing a small amount of a strong basic catalyst such as benzyltrimethyl ammonium hydroxide, adding the desired cyclopentane-1,3-dione compound thereto and heating the mixture, preferably under reflux conditions, until the reaction is complete. The resulting 3-alkoxy-13-Z-8,14-secogona-1,3,5(10),9(11)-tetraene-14,17-diones may then be recovered by conventional laboratory techniques. The organic solvent should preferably be one having a boiling point in excess of 70° C. Among the organic solvents that are operable herein are aromatic hydrocarbons, such as, for example, benzene, toluene, xylene, and the like, and aliphatic alcohols, such as, for example, tert-butanol, sec-pentanol, and the like, as well as mixtures of said aromatic hydrocarbons and said aliphatic alcohols. Other strong basic catalysts that are operable herein are alkali metal alkoxides, such as, for example, sodium methoxide, potassium t-butoxide and the like, and alkali metal hydroxides, such as, for example, sodium hydroxide, potassium hydroxide and the like.

In accordance with the present invention, novel steroid compounds that are active anabolic and/or progestational agents may be synthesized through a series of reactions starting with the aforementioned polycyclic condensation products. Said steroid compounds may be chemically represented by the following formulas:

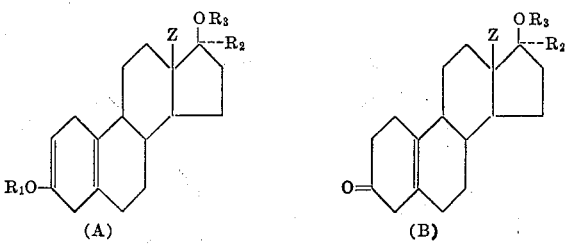

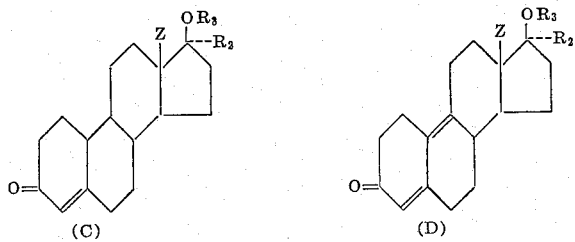

(C)    (D)

wherein Z is a member selected from the group consisting of a hydrogen atom, an alkyl radical having at least 2 carbon atoms, and trifluoromethyl, —CH₂M and —CHM₂ radicals in which M is a member selected from the group consisting of halo, —COOR₄, —OR₄, and —CN radicals, said R₄ being a lower alkyl radical; R₁ is an alkyl radical; R₂ is a member selected from the group consisting of a hydrogen atom and lower alkyl, allyl, methallyl, vinyl, ethynyl, haloethynyl, —CF=CF₂ and —C≡C—CF₃ radicals; and R₃ is a member selected from the group consisting of a hydrogen atom and an alkanoyl radical.

The novel steroids represented above by the structure of Formula A may be denoted chemically as 3-alkoxy-13-Z-17α-R₂-17-OR₃-gona-2,5(10)-dienes; those represented by the structure of Formula B as 13-Z-17α-R₂-17-OR₃-gona-5(10)-en-3-ones; those represented by the structure of Formula C as 13-Z-17α-R₂-17-OR₃-gona-4-en-3-ones; and those represented by the structure of Formula D as 13-Z-17α-R₂-17-OR₃-gona-4,9-dien-3-ones. The subject matter of this invention, as claimed herein, comprises those steroids represented by Formula C above. The other novel steroids, represented by Formulas A, B and D, are the subject matters of copending applications filed simultaneously herewith.

In general terms, the preparation of the novel steroids represented by Formulas A, B, C and D comprises subjecting the corresponding polycyclic condensation products (I) to ring closure by means of an acid catalyzed condensation reaction, thereby forming the corresponding 3-alkoxy-13-Z-gona-1,3,5(10),8,14-pentaen-17-one steroid compounds (II); subjecting (II) to three successive reduction steps to form, respectively, 3-alkoxy-13-Z-gona-1,3,5(10),8-tetraen-17-one (III), 3-alkoxy-13-Z-gona-1,3,5-(10),8-tetraen-17β-ol (IV), and 3-alkoxy-13-Z-9α,14α-gona-2,5(10)-dien-17α-ol (V); oxidizing the 17-hydroxy group of (V) to yield 3-alkoxy-13-Z-gona-2,5(10)-dien-17-one (VI); reacting the resulting ketone (VI) with a ketone reactive addition substance and a proton donating material, said addition substance being capable of providing an R₂ group for addition onto the carbon atom of the 17-keto group, thereby forming the corresponding 3-alkoxy-13-Z-17α-R₂-gona-2,5(10)-dien-17-ol (VII); hydrolyzing (VII) with a mild acidic catalyst to form the corresponding 13-Z-17α-R₂-17-hydroxygona-5(10)-en-3-one (VIII); treating (VIII) with pyridinium bromide perbromide to brominate the double bond in the C₅=C₁₀ position, thereby forming 5α,10β-dibromo-13-Z-17α-R₂-17-hydroxygona-3-one (IX); and dehydrobrominating (IX) to form the 13-Z-17α-R₂-17-hydroxygona-4,9-dien-3-one steroids (X). Alternatively, compounds (VII) or (VIII) may be treated with a strong acid catalyst such as p-toluenesulfonic acid to yield 13-Z-17α-R₂-17-hydroxygona-4-en-3-one (XI).

The foregoing reactions may be illustrated in accordance with the following reaction scheme:

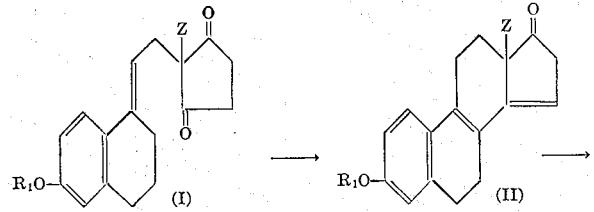
(I)    (II)

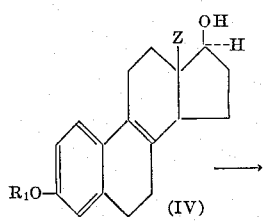
(III)

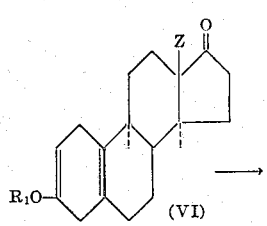
(IV)

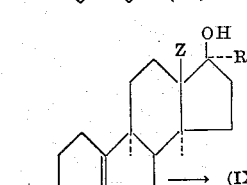
(V)

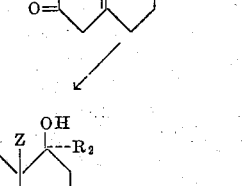
(VI)

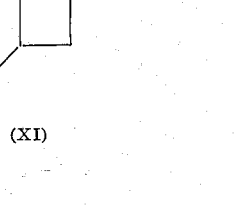
(VII)

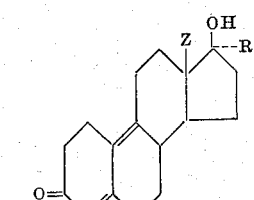
(IX)

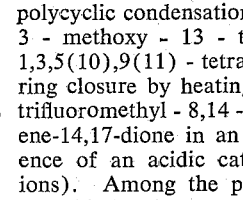
(XI)

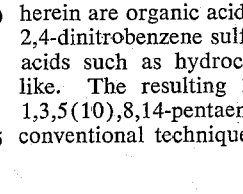
(I)

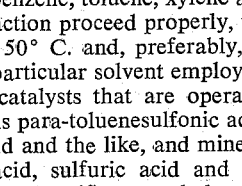
(X)

Accordingly, in a preferred procedure, the starting polycyclic condensation product (exemplified herewith by 3 - methoxy - 13 - trifluoromethyl - 8,14 - secogona-1,3,5(10),9(11) - tetraene - 14,17 - dione) is subjected to ring closure by heating a solution of said 3-methoxy-13-trifluoromethyl - 8,14 - secogona - 1,3,5(10),9(11) - tetra-ene-14,17-dione in an inert organic solvent in the presence of an acidic catalyst (i.e., a source of hydrogen ions). Among the preferred organic solvents that are operable herein are aromatic hydrocarbons having a boiling point over 70° C. such as benzene, toluene, xylene and the like. In order that the reaction proceed properly, the temperature should be above 50° C. and, preferably, at the reflux temperature of the particular solvent employed. Among the preferred acidic catalysts that are operable herein are organic acids such as para-toluenesulfonic acid, 2,4-dinitrobenzene sulfonic acid and the like, and mineral acids such as hydrochloric acid, sulfuric acid and the like. The resulting 3-methoxy-13-trifluoromethyl-gona-1,3,5(10),8,14-pentaen-17-one may then be recovered by conventional techniques such as by extraction with suitable organic solvents. The water which is formed during the course of the reaction is preferably removed by using a Dean-Stark type of water separator when refluxing the mixture.

The resulting 3 - methoxy - 13 - trifluoromethyl - gona-1,3,5(10),8,14-pentaen-17-one is then subjected to selective reduction of the $C_{14}=C_{15}$ double bond, as, for example, by hydrogenation using palladium on barium carbonate as the catalyst or a Raney nickel catalyst of moderate activity until one stoichiometric equivalent of hydrogen is taken up. The 17-keto group of the resulting 3 - methoxy - 13 - trifluoromethyl - gona - 1,3,5(10),8-tetraen-17-one is further reduced by means of a hydride-transfer reagent such as, for example, a metal hydride (e.g., sodium borohydride and lithium aluminum hydride). The resulting 3 - methoxy - 13 - trifluoromethyl-gona-1,3,5(10),8-tetraen-17β-ol is then subjected to further reduction by treatment with an alkali metal, such as potassium and lithium, in liquid ammonia to yield 3-methoxy - 13 - trifluoromethyl - 9α,14a - gona - 2,5(10)-dien-17β-ol.

The 17β-hydroxy group of the resulting 3-methoxy-13-trifluoromethyl - 9α,14α - gona - 2,5(10) - dien - 17β-ol is then subjected to an Oppenauer oxidation reaction to yield 3 - methoxy - 13 - trifluoromethyl - gona - 2,5(10)-dien-17-one. For example, the 3-methoxy-13-trifluoromethyl - 9α,14α - gona - 2,5(10) - dien - 17β - ol is then added to an aromatic hydrocarbon solvent such as benzene, toluene, xylene and the like, and refluxed with an excess of an aliphatic ketone, such as acetone, or a cyclic ketone, such as cyclohexanone, in the presence of a metallic alkoxide, such as aluminum isopropoxide or aluminum tertiary butoxide.

The resulting 3 - methoxy - 13 -trifluoromethyl - gona-2,5(10)-dien-17-one is then reacted with ketone reactive addition substances, as described more fully hereinafter, to yield the 17α-substituted derivatives of 3-methoxy-13-trifluoromethyl - gona - 2,5(10) - dien - 17 - ol which may then be hydrolyzed with either a strong acidic catalyst such as paratoluenesulfonic acid to yield the corresponding 17α-substituted derivatives of 3-methoxy-13-trifluoromethyl-17-hydroxygona-4-en-3-one or with a mild acidic catalyst such as acetic acid to yield the corresponding 17α-substituted derivatives of 3-methoxy-13-trifluoromethyl-17-hydroxygona-5(10)-en-3-one. The $C_5=C_{10}$ double bond of the latter compounds may then be brominated by treatment with pyridinium bromide perbromide to form the corresponding 5α,10β-dibromo compounds which, upon dehydrobromination, yields the 17α-substituted derivatives of 13-trifluoromethyl-17-hydroxygona-4,9-dien-3-one.

An important step in the foregoing series of reactions in the reaction of a ketone reactive addition substance with the 17-keto group of (VI) to give a product with a 17β-hydroxyl group and a 17α-oriented addition group (R₂). Addition reactions involving the carbonyl group (>C=O) are reported in the literature. Most of these reactions are the result of nucleophilic attack on the carbonyl-carbon atoms. Since the electrons of the carbonyl double bond hold together atoms of quite different electronegativity, the electrons are not equally shared. In particular, the electrons are pulled strongly toward the electronegative oxygen atom, the polarity of the carbonyl group being represented as follows:

$$\overset{\delta+}{\underset{/}{\diagdown}}C=\overset{\delta-}{O}$$

As a result, the carbonyl carbon is electron deficient and therefore highly vulnerable to nucleophilic attack. Whatever the mechanism involved, however, addition of an unsymmetrical reagent is oriented so that the nucleophilic (basic) portion attaches itself to the carbonyl-carbon atom and the electrophilic (acidic) portion attaches itself to the carbonyloxygen atom.

For example, in a Grignard reagent (which may be generally designated as RMgX, wherein R is an organo group and X is a halide), the carbon-magnesium bond is a highly polar bond, carbon being negative relative to electropositive magnesium. In the addition to carbonyl compounds, therefore, the organic carbanion (R—) becomes attached to the carbonyl-carbon atom and the electrophilic magnesium to the carbonyl-oxygen atom.

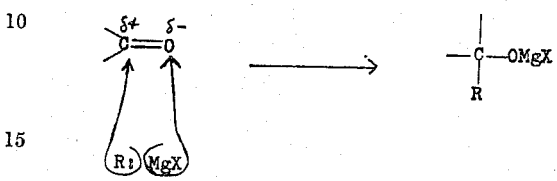

Accordingly, the 17-keto group of the instant 3-alkoxy-13-Z-gona-2,5(10)-dien-17-one compounds (VI) has been found to undergo addition of Grignard reagents wherein the organo group is selected from the class consisting of lower alkyl, allyl, methallyl, ethynyl, vinyl, trifluoromethylethynyl and trifluorovinyl radicals, said organo group adding onto the 17-carbon atom. The magnesium salt of the weakly acidic alcohol that is thus produced is easily converted into the 17β-alcohol by the addition of a proton donating substance, such as, for example, the stronger acid, water.

Similar nucleophilic additions have been found to occur between reagents such as alkali metal acetylide, alkali metal haloacetylide and organolithium compounds, such as, for example, methyllithium, ethyllithium and the like, and the 17-keto group of the 3-alkoxy-13-Z-gona-2,5(10)-dien-17-ones of this invention. The nucleophilic acetylide, haloacetylide or organo group attacks the carbonyl-carbon atom and the metal adds onto the carbonyl-oxygen atom to form the corresponding salt which is in turn converted into the 17β-hydroxy compound in the presence of a proton donator.

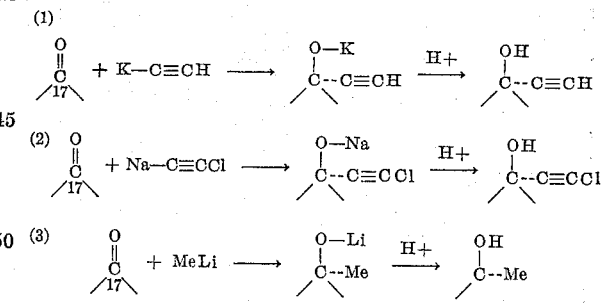

It has also been found that the instant 3-alkoxy-13-Z-gona-2,5(10)-dien-17-ones will undergo reduction of the 17-keto group by means of a hydride-transfer reagent such as, for example, a metal hydride (e.g., sodium borohydride and lithium aluminum hydride). The important step in such reductions in the transfer of a hydrogen, together with its pair of electrons, that is, a "hydride transfer," from the reducing agent to the carbon atom of the carbonyl group, thereby converting the carbonyl compound to a salt which may then be converted to the corresponding 17β-hydroxy compound by means of a proton donator.

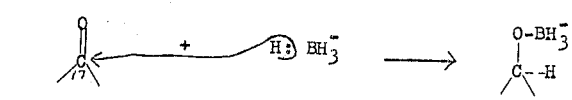

Such hydride-transfer reductions are, in effect, addition reactions to the carbonyl group in which the nucleophilic hydride (H:) attacks the carbonyl-carbon atom and the remaining electrophilic portion adds onto the carbonyl-oxygen atom.

The foregoing reaction mechanisms are preferred as an explanation of the addition reactions occuring in the conversion of the instant 3-alkoxy-13-Z-gona-2,5(10-dien-17-ones (VI) to the corresponding 3-alkoxy-13-Z-17α-R$_2$-gona-2,5(10)-dien-17-ols (VII), although the invention is not meant to be strictly limited to any theory of action.

The solvents utilized in the foregoing addition reactions are, generally, inert organic solvents that are well known for each type of ketone additive employed. For example, with the Grignard, organo-lithium and acetylide types of addition reagents, such solvents as tetrahydrofuran, alkyl ethers (e.g., dimethyl ether, methyl ethyl ether, diethyl ether and the like), and the aromatic hydrocarbons (e.g., benzene, toluene, xylene and the like) are preferred. In hydride transfer reactions, the lower alkanols such as methanol, ethanol, and the like are preferred. The solvent should obviously be void of any reactive unsaturated linkages capable of undergoing addition with the ketone additives utilized herein.

In general terms, therefore, the instant 3-alkoxy-13-Z-gona-2,5(10)-dien-17-ones are reacted in an inert organic solvent with a ketone reactive addition substance capable of providing a nucleophilic R$_2$ group for addition onto the carbon atom of the 17-keto group and an electrophilic portion for addition onto the oxygen atom of the 17-keto group, said R$_2$ being a hydrogen atom or a lower alkyl, allyl, methallyl, vinyl, ethynyl, haloethynyl, trifluoromethyl-ethynyl and trifluorovinyl radical; the resulting salt is converted to the corresponding 17β-hydroxy compound by providing a source of protons to react with said salt, thereby forming the 3-alkoxy-13-Z-17α-R$_2$-gona-2,5 (10)-dien-17-ols of this invention.

The 17β-hydroxy steroids represented above by structures (VII), (VIII), (X) and (XI) may be converted into the corresponding 17β-alkanoyl esters by reaction with an alkanoic acid anhydride or alkanoyl halide in the presence of a tertiary amine such as pyridine. The acid anhydrides which may be used for this purpose include acetic anhydride, propionic acid anhydride, butyric acid anhydride and the like. The 17β-caproate is prepared by the reaction of the respective 17-hydroxygona-compound with caproyl halide in the presence of a tertiary amine base.

The following examples illustrate methods of carrying out the present invention but it is understood that these examples are given for purposes of illustration and not of limitation.

EXAMPLE 1

This example illustrates the preparation of 3-methoxy-13 - methyl - 8,14-secogona-1,3,5(10),9(11)-tetraene-14,17-dione.

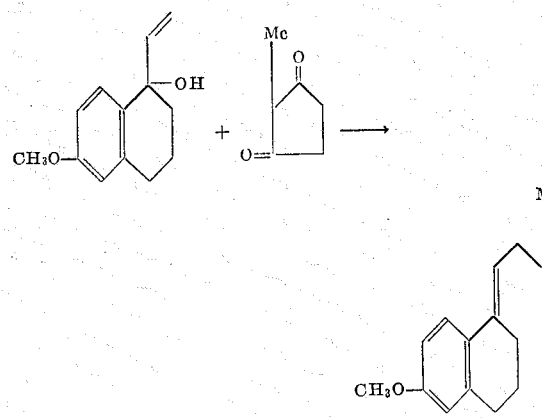

4.10 grams of 1-vinyl-6-methoxy-1-tetralol are dissolved in a mixture of 14 ml. dry xylene and 7 ml. dry tertiary butanol. To this is added 2.24 g. of 2-methyl-cyclopentane-1,3-dione and 0.75 ml. of a 40% methanolic solution of benzyltrimethylammonium hydroxide and the mixture refluxed for one hour. After cooling and diluting with ether, some unreacted methylcyclopentanedione is filtered off and the ether solution washed successively with aqueous NaHCO$_3$, 5% KOH, water and dried. The concentrated solution affords a viscous oily residue with a characteristic U.V. absorption at λ max. 2725 and a carbonyl absorption at 5.80μ in the I.R. Crystallization from ether yields 3-methoxy-13-methyl-8,14-secogona-1, 3,5(10),9(11)-tetraene-14,17-dione (M.P.=77–79° C.).

In accordance with the above procedure, 2-methylcyclopentane-1,3-dione is reacted with 1-vinyl-6-ethoxy-1-tetralol, 1-vinyl-6-propoxy-1-tetralol, 1-vinyl-6-butoxy-1-tetralol and 1-vinyl-6-pentoxy-1-tetralol, respectively, to yield the corresponding 3-alkoxy derivative of 13-methyl-8,14-secogona-1,3,5(10),9(11)-tetraene-14,17-dione.

EXAMPLE 2

This example illustrates a method of preparing 2-Z-cyclopentane-1,3-dione derivatives that are utilized in this invention. The method involves three steps, to wit, (1) the preparation of a triketoglyoxalate, (2) the preparation of a diketosemicarbazone, and (3) the preparation of a cyclopentadione, as illustrated more specifically immediately hereinafter with the preparation of 2-methylcyclopentane-1,3-dione.

Step 1.—*Preparation of triketoglyoxalate*

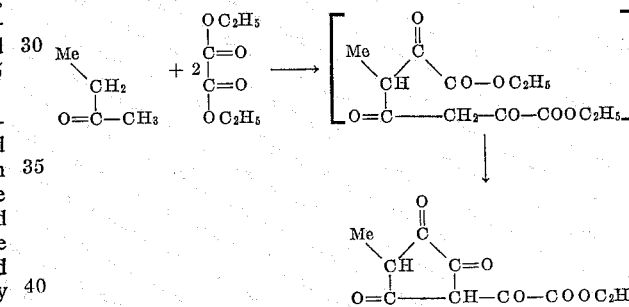

108 grams (2 moles) of fresh sodium methoxide are carefully dissolved in ice-cooled 580 ml. absolute alcohol and then cooled to 5° C. With stirring and continued cooling, a mixture of 72 g. (1 mole) of ethyl-methylketone and 320 g. (2.2 moles) of diethyloxalate is added over a period of 30 minutes and then heated at 50° C. for 40 minutes. The mixture is cooled in an ice bath and, with strong stirring, a cold mixture of 55 ml. conc. H$_2$SO$_4$ and 55 ml. H$_2$O is slowly added. After addition, the reaction mixture is allowed to come to room temperature and the salt filtered. The filtrate is concentrated in vacuo to about 200 ml. On cooling, a precipitate is obtained, which is recrystallized from ethyl acetate. The resulting crystalline product, 4-methyl-2,3,5-trioxocyclopentane glyoxylic acid ethyl ester, is filtered and dried; yield: 70 g.; M.P. 158–160° C. The reaction of Step 1 may be represented by the above equation.

Step 2.—*Preparation of diketosemicarbazone*

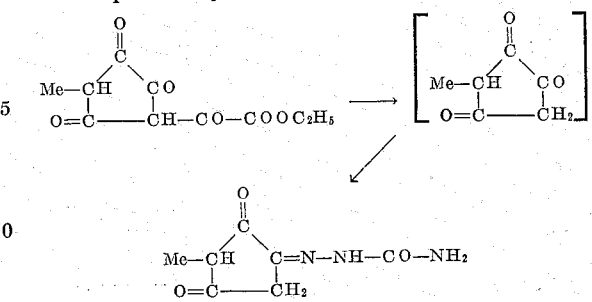

70 grams (0.31 mole) of the triketoglyoxalate obtained from Step 1 is suspended in 1050 ml. 2.5 N HCl and slowly heated with stirring to reflux. After refluxing for about 1 hour, the solution is cooled to room temperature and added to an equal volume of alcohol. At room temperature there is then added dropwise with stirring over a period of 1½ hours a solution of 53.5 g. (0.79 mole) of semicarbazide-HCl and 74 g. of Na-acetate in 490 ml. $H_2O$. A precipitate of 3-methyl-2,4-cyclopentadiene-1-semicarbazone is obtained; yield: 54 g. The material has no sharp melting point, decomposing around 290° C. The reaction of Step 2 may be represented by the above equation.

Step 3.—*Preparation of 2-methylcyclopentane-1,3-dione*

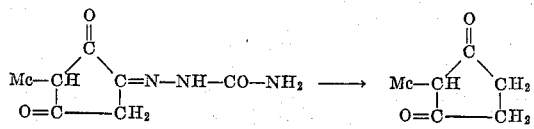

Fifty-four grams of KOH are dissolved with stirring in 540 ml. ethylene glycol and the solution heated to 130° C. Fifty-four grams of the semicarbazone obtained in Step 2 is then added gradually and with stirring and the mixture refluxed for 1½ hours. The mixture is then cooled and concentrated under a vacuum (0.5 mm.) to dryness. The residue is dissolved in water, ice-cooled and acidified to pH 3. A precipitate of 2-methylcyclopentane-1,3-dione is obtained which is filtered off and dried; yield: 27.4 g.: M.P.: 205–208° C. The reaction of Step 3 may be represented by the above equation.

EXAMPLE 3

The procedures of Example 2 are followed except that equivalent quantities of other ketones are utilized in place of the ethylmethyl ketone of Step 1 therein, thereby obtaining various derivatives of cyclopentane-1,3-dione. Accordingly, the use of other lower alkyl-methyl ketones, such as propylmethyl ketone, isobutylmethyl ketone, n-butylmethyl ketone and amylmethyl ketone, yields the corresponding 2-lower alkyl-cyclopentane-1,3-dione compounds, such as 2-ethyl-cyclopentane-1,3-dione, 2-isopropyl-cyclopentane-1,3-dione, 2-n-propyl-cyclopentane-1,3-dione and 2-n-butyl-cyclopentane-1,3-dione, respectively. Similarly, the use of 1,1,1-trifluoro-3-butanone ($CF_3$—$CH_2$—CO—$CH_3$), in lieu of the ethyl methyl ketone of Step 1, yields 2-trifluoromethyl-cyclopentane-1,3-dione. In like manner, the use of etherified methyl ketones having the formula $CH_3$—CO—$CH_2$—$CH_2OR''$, wherein $R''$ is an alkyl radical preferably having from 1 to 5 carbon atoms, such as β-methoxyethyl methyl ketone, β-ethoxyethyl methyl ketone, β-propoxyethyl methyl ketone, β-butoxyethyl methyl ketone and β-amyloxyethyl methyl ketone, yields the corresponding 2-alkoxymethyl derivatives of cyclopentane-1,3-dione, such as 2-methoxymethyl-cyclopentane-1,3-dione, 2-ethoxymethyl-cyclopentane-1,3-dione, 2-propoxymethyl-cyclopentane-1,3-dione, 2-butoxymethyl-cyclopentane-1,3-dione and 2-amyloxy-methyl-cyclopentane-1,3-dione, respectively.

EXAMPLE 4

This example illustrates a method of preparing 2-difluoromethyl-cyclopentane-1,3-dione. Ten grams of cyclopentane-1,3-dione are dissolved in a mixture of tetrahydrofuran and tertiary butanol followed by the addition of 10 g. of potassium-t-butoxide. The mixture is cooled to 0° C. and a stream of $CHClF_2$ is passed into the mixture for 5 hours with constant cooling. The reaction product is poured onto excess ice water and acidified to pH 2.5 followed by repeated chloroform extractions. The chloroform extracts are combined, washed with a small amount of ice water, dried and concentrated in vacuo to yield 6.2 g. of 2-difluoromethyl-cyclopentane-1,3-dione.

EXAMPLE 5

Using the same procedure as in Example 1, 1-vinyl-6-methoxy-1-tetralol is reacted with the 2-Z-cyclopentane-1,3-diones prepared in Examples 3–4 to yield the corresponding 3-methoxy-13-Z-8,14-secogona-1,3,5(10),9(11)-tetraene-14,17-dione compounds, as shown in Table I.

This example illustrates the preparation of 3-methoxy-13-Z-secogona-1,3,5(10),9(11)-tetraene-14,17-dione wherein Z is a hydrogen atom, an alkyl radical having at least 2 carbon atoms, and difluoromethyl, trifluoromethyl and alkoxymethyl radicals.

TABLE I

| 2-R-Cyclopentane-1,3-dione | Corresponding 3-methoxy-13-R-8,14-secogona-1,3,5(10),9(11)-tetraene-14,17-dione |
|---|---|
| Cyclopentane-1,3-dione | 3-methoxy-8,14-secogona-1,3-5(10),-9(11)-tetraene-14,17-dione. |
| 2-ethyl-cyclopentane-1,3-dione | 3-methoxy-13-ethyl-8,14-secogona-1,3,5(10),9(11)-tetraene-14,17-dione. |
| 2-isopropyl-cyclopentane-1,3-dione | 3-methoxy-13-isopropyl-8,14-secogona-1,3,5(10),9(11)-tetraene-14,17-dione. |
| 2-n-propyl-cyclopentane-1,3-dione | 3-methoxy-13-n-propyl-8,14-secogona-1,3,5(10),9(11)-tetraene-14,17-dione. |
| 2-n-butyl-cyclopentane-1,3-dione | 3-methoxy-13-n-butyl-8,14-secogona-1,3,5(10),9(11)-tetraene-14,17-dione. |
| 2-difluoromethyl-cyclopentane-1,3-dione. | 3-methoxy-13-difluoromethyl-8,14-secogona-1,3,5(10),9(11)-tetraene-14,17-dione. |
| 2-trifluoromethyl-cyclopentane-1,3-dione. | 3-methoxy-13-trifluoromethyl-8,14-secogona-1,3,5(10),9(11)-tetraene-14,17-dione. |
| 2-methoxymethyl-cyclopentane-1,3-dione. | 3-methoxy-13-methoxymethyl-8,14-secogona-1,3,5(10),9(11)-tetraene-14,17-dione. |
| 2-ethoxymethyl-cyclopentane-1,3-dione. | 3-methoxy-13-ethyoxmethyl-8,14-secogona-1,3,5(10),9(11)-tetraene-14,17-dione. |
| 2-pentoxymethyl-cyclopentane-1,3-dione. | 3-methoxy-13-pentoxymethyl-8,14-secogona-1,3,5(10),9(11)-tetraene-14,17-dione. |

EXAMPLE 6

Using the same procedure as in Example 1, the 2-Z-cyclopentane-1,3-diones prepared in Examples 3–4 are reacted, respectively, with 1-vinyl-6-ethoxy-1-tetralol, 1-vinyl-6-propoxy-1-tetralol, 1-vinyl-6-butoxy-1-tetralol, and 1-vinyl-6-pentoxy-1-tetralol to yield the corresponding 3-alkoxy derivatives of 13-Z-8,14-secogona-1,3,5(10),9(11)-tetraene-14,17-dione.

EXAMPLE 7

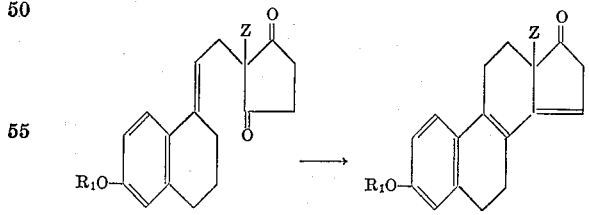

Each of the respective 3-alkoxy-13-Z-8,14-secogona-1,3,5(10),9(11)-tetraene-14,17-diones obtained from Examples 5 and 6, wherein Z is a hydrogen atom or an ethyl, isopropyl, n-propyl, n-butyl, difluoromethyl, trifluoromethyl or alkoxymethyl radical, is converted into the corresponding 3-alkoxy-13-Z-gona-1,3,5(10),8,14-pentaen-17-one compound by the following procedure.

2.5 grams of the respective 3-alkoxy-13-Z-8,14-secogona-1,3,5(10),9(11)-tetraene-14,17-dione are dissolved in 54 ml. of benzene and, after addition of 125 mg. of para-toluenesulfonic acid monohydrate, the mixture is refluxed for 10 minutes using a water separator. After cooling and diluting with ether, the mixture is washed with aqueous sodium bicarbonate and water, dried over anhydrous potassium carbonate; and concentrated in vacuo to yield the corresponding 3-alkoxy-13-Z-gona-1,3,5(10),8,14-pentaen-17-one compound.

EXAMPLE 8

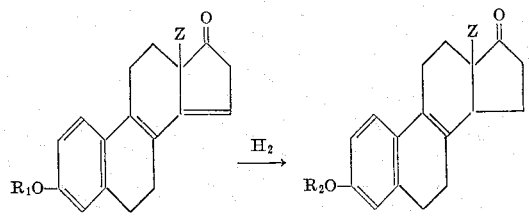

Each of the respective 3-alkoxy-13-Z-gona-1,3,5(10),8,14-pentaen-17-one compounds of Example 7 is converted into the corresponding 3-alkoxy-13-Z-gona-1,3,5(10),8-tetraen-17-one compound by the following procedure.

1.4 grams of the respective 3-alkoxy-13-Z-gona-1,3,5(10),8,14-pentaen-17-one are dissolved in 50 ml. dry tetrahydrofuran and hydrogenated in the presence of 250 mg. palladium on barium carbonate catalyst. Hydrogenation is stopped after 1 stoichiometric equivalent of hydrogen is absorbed; the solution is filtered free of catalyst and concentrated in vacuo to yield the corresponding 3 - alkoxy - 13 - Z - gona - 1,3,5(10),8 - tetraen - 17 - one compound.

EXAMPLE 9

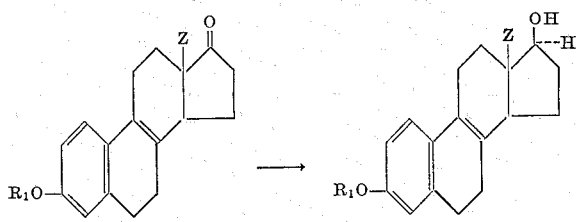

Each of the respective 3-alkoxy-13-Z-gona-1,3,5(10),8-tetraen-17-one compounds of Example 8 is converted into the corresponding 3-alkoxy-13-Z-gona-1,3,5(10),8-tetraen-17β-ol compound by the following procedure.

1 gram of the respective 3-alkoxy-13-Z-gona-1,3,5(10),8-tetraen-17-one is dissolved in 10 ml. of methanol and to this solution are added 500 mg. of $NaBH_4$ at 0° C. The mixture is then stirred at room temperature for 12 hours. The mixture is worked up by acidifying with acetic acid, concentrating in vacuo, and extracting the residue with benzene. The dried benzene solution affords the corresponding 17β-carbinol derivative which is recrystallized from ether.

EXAMPLE 10

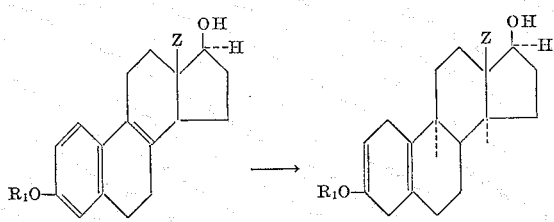

Each of the respective 3-alkoxy-13-Z-gona-1,3,5(10),8-tetraen-17β-ol compounds of Example 9 is converted into the corresponding 3-alkoxy-13-Z-9α,14α-gona-2,5(10)-dien-17β-ol compound by the following procedure.

500 milligrams of the respective 17β-carbinol derivative obtained from Example 9 are dissolved in a mixture of 50 ml. dry ether and 50 ml. dry tetrahydrofuran and added to a solution of 100 ml. liquid ammonia. To this mixture is added 0.8 g. of potassium metal. After stirring for 30 minutes, there is added, successively, 80 ml. of absolute ethanol, 50 ml. of liquid ammonia and 2 g. of lithium metal. After decolorization, the ammonia is evaporated off; the residue is taken up in ether, washed with water, dried and concentrated in vacuo to yield the corresponding 3 - alkoxy - 13 - Z - 9α,14α - gona - 2,5(10)-dien-17β-ol.

EXAMPLE 11

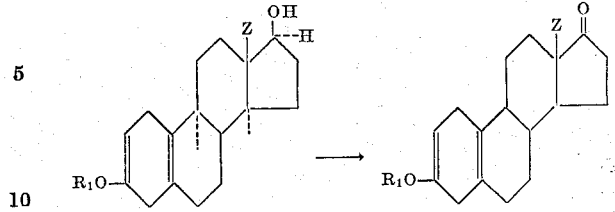

Each of the respective 3-alkoxy-13-Z-9α,14α-gona-2,5(10)-dien-17β-ol compounds of Example 10 is converted into the corresponding 3-alkoxy-13-Z-gona-2,5(10)-dien-17-one compound by the following procedure.

To a solution of 150 mg. of distilled aluminum isopropoxide in 6 ml. of anhydrous toluene are added 145 mg. of the respective 3-alkoxy-13-Z-9α,14α-gona-2,5(10)-dien-17β-ol with stirring. Distilled cyclohexanone (1.4 g.) is then added and the mixture refluxed for 2.5 hours. After cooling, a saturated solution of Rochelle salt (2 ml.) is added to decompose aluminum alcoholates. Toluene and cyclohexanone are removed under vacuo and the product is chromatographed on basic alumina and eluted with ether-petroleum ether mixtures to yield the corresponding 3-alkoxy-13-Z-gona-2,5(10)-dien-17-one.

EXAMPLE 12

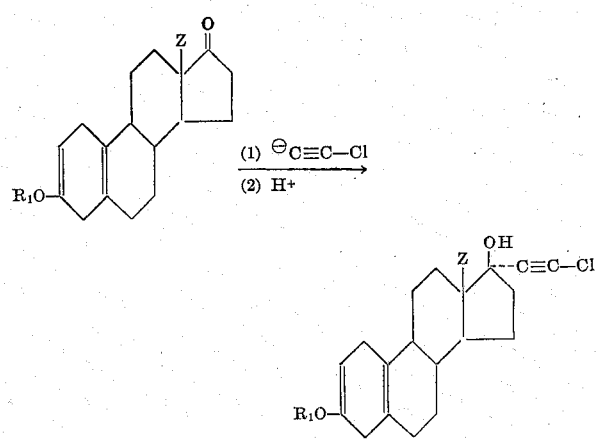

Each of the respective 3-alkoxy-13-Z-gona-2,5(10)-dien-17-one compounds of Example 11 is converted into the corresponding 3-alkoxy-13-Z-17α-haloethynyl-gona-2,5(10)-dien-17-ol compound by the following procedure.

A solution consisting of 1.7 g. (1.32 cc.) of cis-1,2-dichloroethylene in 10 cc. of sodium-dried ether is added over 0.5 hour at 0° C. to 3 cc. of a 1.4 N-solution of methyl lithium (prepared by adding lithium to methyl iodide in dry ether solution under nitrogen at about 10° C.) in 25 cc. of sodium-dried ether. The reaction mixture is stirred at room temperature under nitrogen for an additional 1½ hours, followed by the addition, over a 15-minute period, of 100 mg. of the respective 3-alkoxy-13-Z-gona-2,5(10)-dien-17-one in 4 cc. of sodium-dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether (8:2). Crystallization from acid-free methanol affords the corresponding 3-alkoxy-13-Z-17α-chloroethynylgona-2,5(10)-dien-17-ol compound.

In accordance with the above procedure, but using 1,2-dibromoethylene in place of 1,2-dichloroethylene, there is obtained the corresponding 3-alkoxy-13-Z-17α-bromoethynylgona-2,5(10)-dien-17-ol.

EXAMPLE 13

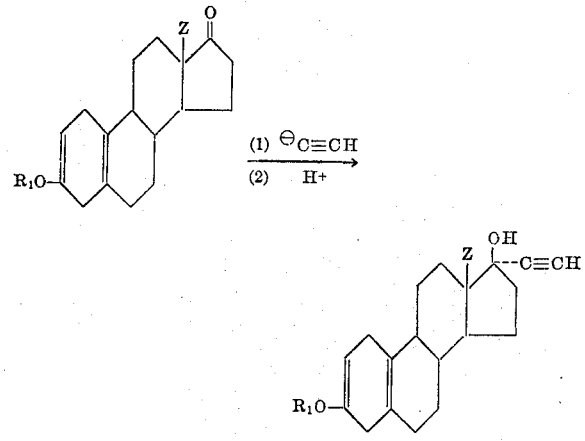

Each of the respective 3-alkoxy-13-Z-gona-2,5(10)-dien-17-one compounds of Example 11 is converted into the corresponding 3 - alkoxy-13-Z-17α-ethynyl-gona-2,5(10)-dien-17-ol compound by the following procedure.

30 milliliters of liquid ammonia is charged into a 3-neck flask which has been cooled in Dry Ice and fitted with a stirrer, an inlet tube and an outlet tube. 2 grams of metallic potassium in small pieces are added and acetylene is introduced until the blue color is discharged, indicating the formation of potassium acetylide. A solution of 2.5 g. of the negative 3-alkoxy-13-Z-gona-2,5(10)-dien-17-one in 15 ml. of ether and 15 ml. of benzene is added with stirring at a temperature of −60° to −70° C. Acetylene is then bubbled through the slurry for 3 hours. The Dry Ice bath is removed and the ammonia is allowed to evaporate overnight. The residue is diluted with water, filtered and the filtrate extracted with benzene. The benzene extract is dried, concentrated in vacuo, chromatographed on silica gel and eluted with ether-petroleum ether mixtures to yield the corresponding 3-alkoxy-13-Z-17α-ethynyl-gona-2,5(10)-dien-17-ol.

EXAMPLE 14

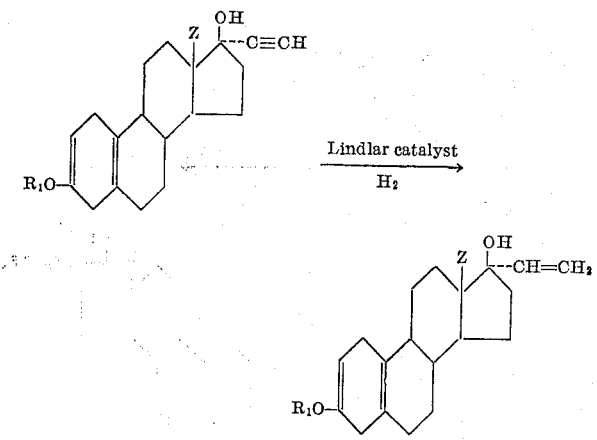

A solution of 200 mg. of the respective 3-alkoxy-13-Z-17α-ethynyl-gona-2,5(10)-dien-17-ols of Example 13 in 10 ml. of ethylacetate is reduced with hydrogen in the presence of 25 mg. of Lindlar catalyst (lead deactivated palladium on a calcium carbonate support) at atmospheric pressure until one mole of hydrogen has been taken up. The product is filtered and the filtrate concentrated in vacuo. The concentrate is chromatographed on silica gel and eluted with ether-petroleum ether mixtures to yield the corresponding 3-alkoxy-13-Z-17α-vinyl-gona-2,5(10)-dien-17-ol.

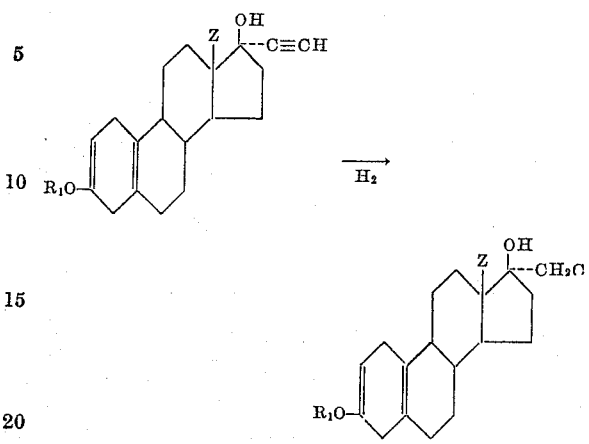

A solution of 200 mg. of the respective 3-alkoxy-13-Z-17α-ethynyl-gona-2,5(10)-dien-17-ols of Example 13 in 10 ml. of dioxane is reduced with hydrogen in the presence of 25 mg. of palladium on barium carbonate at atmospheric pressure until two moles of hydrogen have been taken up. The product is filtered, and the filtrate concentrated in vacuo and chromatographed on silica gel. Elution with ether-petroleum ether mixtures yields the corresponding 3 - alkoxy - 13-Z-17α-ethyl-gona-2,5(10)-dien-17-ol.

EXAMPLE 15

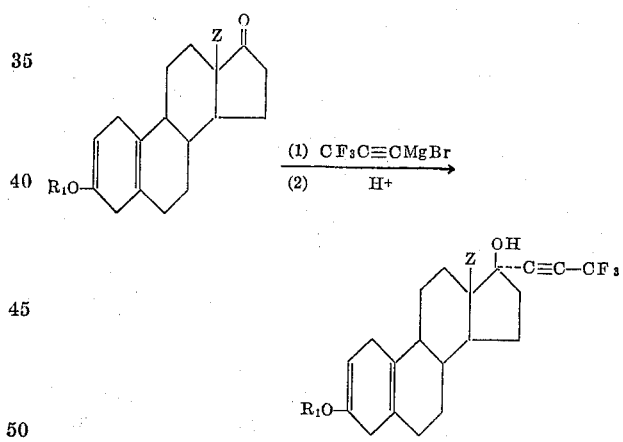

Each of the respective 3-alkoxy-13-Z-gona-2,5(10)-dien-17-one compounds of Example 11 is converted into the corresponding 3-alkoxy-13 - Z - 17α - trifluoromethyl-ethynyl-gona-2,5(10)-dien-17-ol compound by the following procedure.

A 50 ml. round bottom flask is fitted with a Dry-Ice condenser, a dropping funnel and a magnetic stirrer. After the addition of 210 mg. of metallic magnesium, the entire system is purged with nitrogen gas and flame dried. 5 ml. of dry ether is then added, followed by the dropwise addition, with stirring, of 1 ml. of ethyl bromide in 5 ml. of ether. After all the magnesium has reacted with the ethyl bromide, 5 ml. of trifluoropropyne (prepared by the reaction of propiolic acid with sulfur tetrafluoride) is distilled into the reaction flask and the mixture refluxed under Dry-Ice-acetone for one hour. The Dry-Ice-acetone condenser is then removed, the reaction allowed to warm to room temperature and the excess gaseous trifluoropropyne distilled off. A solution of 1.0 g. of the respective 3-alkoxy-13-Z-gona-2,5(10)-dien-17-one in 5 ml. of benzene and 5 ml. of ether is added and the mixture stirred for 16 hours at room temperature. Water is then added and the mixture extracted with ether. The ether extracts are washed with water until the washings are weakly basic, dried over sodium sulfate and concentrated in vacuo. The residue is chromatographed on silica gel and eluted with ether-petroleum ether mixtures to yield the corresponding 3-alkoxy-13 - Z - 17α - trifluoromethyl-ethynyl-gona-2,5(10)-dien-17-ol.

EXAMPLE 16

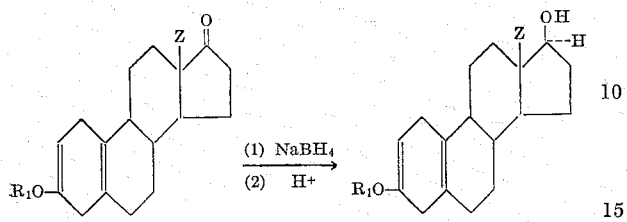

Each of the respective 3-alkoxy-13-Z-gona-2,5(10)-dien-17-one compounds of Example 11 is converted into the corresponding 3-alkoxy-13-Z-17α-hydro-gona-2,5(10)-dien-17β-ol compound by the following procedure.

A solution of 100 mg. of the respective 3-alkoxy-13-Z-gona-2,5(10)-dien-17-one in 20 ml. of methanol is treated with 20 mg. of sodium borohydride for 1 hour at 0° C. The solution is poured into aqueous sodium dihydrogen phosphate and the product is extracted with benzene, dried, and concentrated in vacuo, followed by chromatography on silica gel and elution with ether-petroleum ether mixtures to yield the corresponding 3-alkoxy-13-Z-17α-hydro-gona-2,5(10)-dien-17β-ol.

EXAMPLE 17

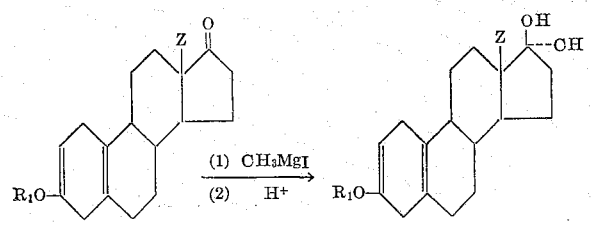

Each of the respective 3-alkoxy-13-Z-gona-2,5(10)-dien-17-one compounds of Example 11 is converted into the corresponding 3-alkoxy-13-Z-17α-methyl-gona-2,5(10)-dien-17-ol compound by the following procedure.

A solution of 300 mg. of the respective 3-alkoxy-13-Z-gona-2,5(10)-dien-17-one in 20 cc. of ether is treated with 1.4 ml. of 1 N methylmagnesium iodide in ether and the mixture is stirred for 1 hour at room temperature. The mixture is then diluted with water, and the resulting product is taken up in ether, dried and concentrtaed in vacuo. Chromatography over silica gel and elution with ether-petroleum ether mixtures yields the corresponding 3-alkoxy-13-Z-17α-methyl-gona-2,5(10)-dien-17-ol.

EXAMPLE 18

Using the same procedure as in Example 17, but substituting an allylmagnesium halide for the Grignard reagent therein, there are obtained as products the corresponding 3 - alkoxy-13-Z-17α-allyl-gona-2,5(10)-dien-17-ols, which may be represented by the following formula:

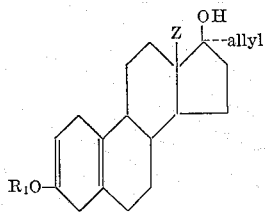

EXAMPLE 19

Using the same procedure as in Example 17, but substituting a methallylmagnesium halide for the Grignard reagent therein, there are obtained as products the corresponding 3 - alkoxy-13-Z-17α-methallyl-gona-2,5(10)-dien-17-ols, which may be represented by the following formula:

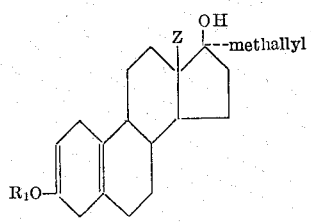

EXAMPLE 20

Using the same procedure as in Example 17, but substituting a vinylmagnesium halide for the Grignard reagent therein, there are obtained as products the corresponding 3 - alkoxy-13-Z-17α-vinyl-gona-2,5(10)-dien-17-ols, which may be represented by the following formula:

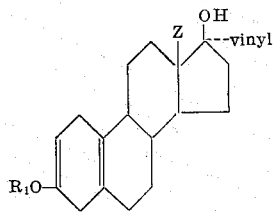

EXAMPLE 21

Using the same procedure as in Example 17, but substituting an ethynlmagnesium halide for the Grignard reagent therein, there are obtained as products the corresponding 3 - alkoxy-13-Z-17α-allyl-2,5(10)-dien-17-ols, which may be represented by the following formula:

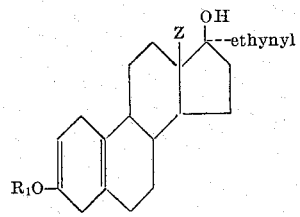

EXAMPLE 22

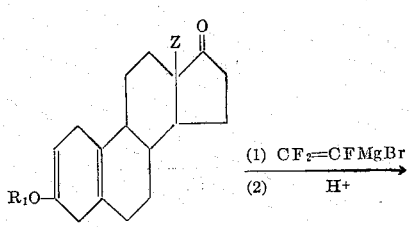

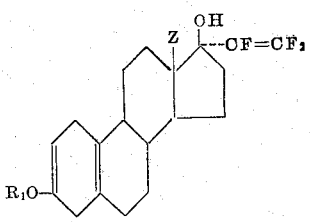

Each of the respective respective 3-alkoxy-13-Z-gona-2,5(10)-dien-17-one compounds of Example 11 is converted into the corresponding 3-alkoxy-13-Z-17α-trifluoro-vinyl-gona-2,5(10)-dien-17-ol compound by the following procedure.

A solution of 300 mg. of the respective 3-alkoxy-13-Z-gona-2,5(10)-dien-17-one in 20 ml. of tetrahydrofuran is treated with 1.4 ml. of a 1 N solution of trifluorovinyl-magnesium bromide in tetrahydrofuran. The solution is stirred at room temperature for 3 hours and then diluted with water. The product is extracted with ether and chromatographed on silica gel. Elution with ether-petroleum ether mixtures yields the corresponding 3-alkoxy-13-Z-17α-trifluorovinyl-gona-2,5(10)-dien-17-ol.

EXAMPLE 23

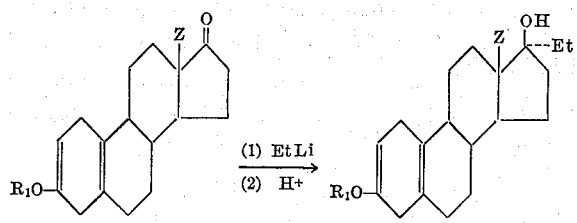

This example illustrates a method of preparing the novel 3-alkoxy-13-Z-17α - alkyl - gona-2,5(10)-dien-17-ol compounds of this invention using an alkyllithium as the 17-keto additive, exemplified in the above equation by ethyllithium. Each of the respective 3-alkoxy-13-Z-gona-2,5(10)-dien-17-one compounds of Example 11 is converted into the corresponding 3-alkoxy-13-Z-17α-alkyl-gona-2,5(10)-dien-17-ol compound by the following procedure.

A solution of 300 mg. of the respective 3-alkoxy-13-Z-gona-2,5(10)-dien-17-one in 20 cc. of ether is treated with 1.4 ml. of 1 N ethyllithium in ether and the mixture is stirred for 1 hour at room temperature. The mixture is then diluted with water, and the resulting product is taken up in ether, dried and concentrated in vacuo. Chromatography over silica gel and elution with ether-petroleum ether mixtures yields the corresponding 3-alkoxy-13-Z-17α-alkyl-gona-2,5(10)-dien-17-ol.

EXAMPLE 24

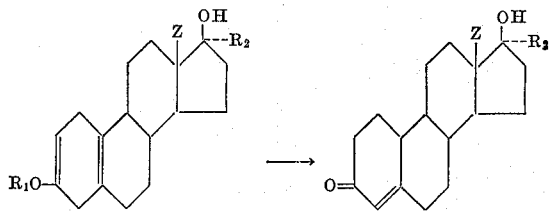

Each of the respective 3-alkoxy-13-Z-17α-$R_2$-2,5(10)-dien-17-ol compounds of Examples 12–23, wherein $R_2$ is a hydrogen atom of a lower alkyl, allyl, methallyl, vinyl, ethynyl, haloethynyl, trifluorovinyl or trifluoromethylethynyl radical, is converted into the corresponding 13-Z-17α-$R_2$-17-hydroxygona-4-en-3-one compound by the following procedure.

A solution consisting of 10 mg. of the respective 3-alkoxy-13-Z-17α-$R_2$-gona-2,5(10)-dien-17-ol, 2 cc. of acetone and 2 mg. of para-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords the corresponding 13-Z-17α-$R_2$-17-hydroxygona-4-en-3-one compound.

EXAMPLE 25

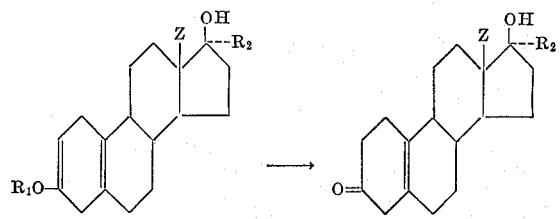

Each of the respective 3-alkoxy-13-Z-17α-$R_2$-2,5(10)-dien-17-ol compounds of Examples 12–23 is converted into the corresponding 13-Z-17α-$R_2$-17-hydroxygona-5(10)-en-3-one compound by the following procedure.

To a solution of 160 mg. of the respective 3-alkoxy-13-Z-17α-$R_2$-gona-2,5(10)-dien-17-ol in 1.6 cc. of dioxane and 7.2 cc. of absolute ethanol are added 3.2 cc. of glacial acetic acid and, immediately thereafter, 1.6 cc. of water. This reaction mixture is left standing at room temperature for 5 hours. It is then poured into an ice-sodium bicarbonate solution, allowed to stand until the mixture is basic, and extracted with benzene. The benzene extracts are washed with water until the washings are only slightly basic and then dried over anhydrous potassium carbonate, filtered and concentrated in vacuo. By crystallization of the residual material from ether, the corresponding 13-Z-17α-$R_2$-17-hydroxygona-5(10) - en - 3 - one compound is obtained.

EXAMPLE 26

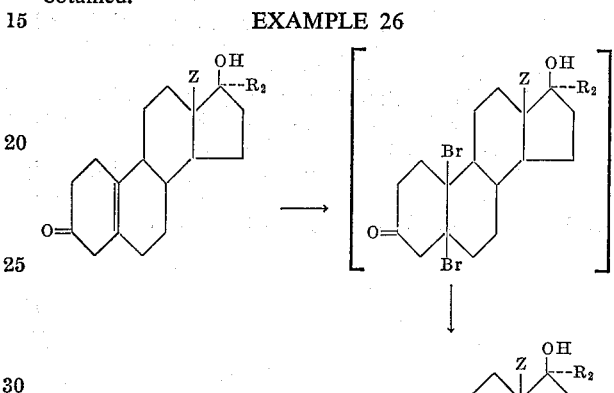

Each of the respective 13-Z-17α-$R_2$-17-hydroxygona-5(10)-en-3-one compounds of Example 25 is converted into the corresponding 13-Z-17α-$R_2$-17-hydroxygona-4,9-dien-3-one compound by the following procedure.

To 100 mg. of the respective 13-Z-17α-$R_2$-17-hydroxygona-5(10)-en-3-one in 5 cc. of pyridine is added one equivalent of bromine. The reaction mixture is stirred for two hours at room temperature, poured into ice water and the aqueous mixture extracted with ether. The ether extract is washed with water, dried over sodium sulfate, and concentrated in vacuo to yield the corresponding 13-Z-17α-$R_2$-17-hydroxygona-4,9-dien-3-one compound.

EXAMPLE 27

This example illustrates a method of converting the 17β-hydroxy steroids of Examples 12–26 into the corresponding 17β-alkanoyl ester derivatives thereof.

One hundred mg. of the respective 17β-hydroxy steroid are heated with 1 cc. of acetic anhydride and 1.2 cc. of pyridine on a steam bath for 6 hours. The reaction mixture is then poured onto ice and extracted with chloroform. The extract is washed with water and concentrated. The concentrate is chromatographed over acid-washed alumina and eluted with mixtures of ether and petroleum ether to yield the corresponding 17β-acetoxygona esters.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of 13-alkyl-17α-trifluorovinyl - 17 - hydroxygona-4-en-3-one and the 17β-alkanoyl esters thereof, wherein said 13-alkyl is a lower alkyl radical containing at least 2 carbon atoms.

2. A compound selected from the group consisting of 13-alkyl-17α - trifluoromethylethynyl - 17 - hydroxygona-4-en-3-one and the 17β alkanoyl esters thereof, wherein said 13-alkyl is a lower alkyl radical containing at least 2 carbon atoms.

3. A compound selected from the group consisting of 13-trifluoromethyl-17-hydroxygona-4-en-3-one and the 17β-alkanoyl esters thereof.

4. A compound selected from the group consisting of 13-trifluoromethyl-17α-alkyl-17 - hydroxygona-4-en-3-one and the 17β-alkanoyl esters thereof.

5. A compound selected from the group consisting of 13-trifluoromethyl-17α-allyl - 17 - hydroxygona-4-en-3-one and the 17β-alkanoyl esters thereof.

6. A compound selected from the group consisting of 13-trifluoromethyl-17α-methallyl - 17 - hydroxygona-4-en-3-one and the 17β-alkanoyl esters thereof.

7. A compound selected from the group consisting of 13-trifluoromethyl-17α-vinyl-17 - hydroxygona-4-en-3-one and the 17β-alkanoyl esters thereof.

8. A compound selected from the group consisting of 13-trifluoromethyl-17α-ethynyl - 17 - hydroxygona-4-en-3-one and the 17β-alkanoyl esters thereof.

9. A compound selected from the group consisting of 13-trifluoromethyl-17α-haloethynyl - 17 - hydroxygona-4-en-3-one and the 17β-alkanoyl esters thereof.

10. A compound selected from the group consisting of 13-trifluoromethyl-17α-trifluorovinyl - 17 - hydroxygona-4-en-3-one and the 17β-alkanoyl esters thereof.

11. A compound selected from the group consisting of 13 - trifluoromethyl - 17α - trifluoromethylethynyl - 17-hydroxygona-4-en-3-one and the 17β-alkanoyl esters thereof.

12. A compound selected from the group consisting of 13-difluoromethyl-17α-chloroethynyl-17 - hydroxygona-4-en-3-one and the 17β-alkanoyl esters thereof.

References Cited by the Examiner

UNITED STATES PATENTS

| 2,838,530 | 6/1958 | Colton | 260—397.4 |
| 3,067,214 | 12/1962 | Oberster et al. | 260—397.4 |

OTHER REFERENCES

Velluz et al., "Tetrahedron Letters," No. 3 (1961), pp. 127–130.

ELBERT L. ROBERTS, *Primary Examiner.*

LEWIS GOTTS, *Examiner.*